United States Patent Office 3,488,296
Patented Jan. 6, 1970

3,488,296
OXONATION PROCESS
William Lambert Senn, Jr., and Joseph Kern Mertzweiler, Baton Rouge, La., and Michael David Bentley, Austin, Tex., assignors to Esso Research and Engineering Company, a corporation of Delaware
No Drawing. Filed Feb. 6, 1967, Ser. No. 614,049
Int. Cl. C07c 45/12; B01j 11/82
U.S. Cl. 252—431
12 Claims

ABSTRACT OF THE DISCLOSURE

Essentially linear oxygenated products are prepared by reacting an olefinic compound under oxonation conditions of elevated temperatures and synthesis gas pressures in the presence of a catalyst system comprising a Group VIII metal compound in complex bond with carbon monoxide and a biphyllic ligand such as $XR_3$ where X is phosphorus or arsenic and R is $C_{1-20}$ alkyl or alkoxy, and the reaction product of a metal having an atomic number from 22 to 25 and a biphyllic ligand such as $XR_3$, where X is phosphorus or arsenic and R is $C_{1-20}$ alkyl or alkoxy.

---

This invention relates to the preparation of oxygenated organic compounds, particularly aldehydes and alcohols, by the reaction of an olefinic compound under oxonation reaction conditions, in the presence of an improved oxonation catalyst. More specifically, this invention relates to a process for improving the selectivity to linear reaction products in an oxonation reaction by utilizing a novel catalyst system which is comprised of a Group VIII metal in complex bond with carbon monoxide and a biphyllic ligand and the reaction product of a metal having an atomic number from 22 to 25 and a biphyllic ligand. In a preferred embodiment of this invention the catalyst is prepared in the presence of the olefinic compound to be oxygenated, thereby allowing the olefinic compound to be oxygenated immediately upon formation of the catalyst.

The oxonation or oxo reaction (also known as hydroformylation) is a process for introducing oxygen into organic compounds characterized by olefinic unsaturation. The reaction is normally conducted under elevated synthesis gas pressures and elevated temperatures. A complex metal catalyst system, normally soluble in the reactioon mixture, is ordinarily utilized to promote the reaction. Unfortunately, under these conditions, terminal olefinic bonds tend to isomerize to internal positions, resulting in the preparation of branched products. Linear products are highly desirable, for example, in the preparation of biodegradable detergents from linear alcohols. Recently developed catalysts such as the metal carbonyl-ligand type systems, e.g., U.S. 3,239,570, achieve some selectivity to linear products but still result in the preparation of a high percentage of branched products. It has now been discovered, however, that the selectivity to linear reaction products from the oxonation process can be greatly enhanced by utilizing the novel catalyst system herein described.

Thus, in accordance with this invention, essentially linear oxygenated products are prepared by the reaction of an olefinic compound with carbon monoxide and hydrogen, under oxonation reaction conditions, in the presence of a soluble catalyst system comprising a Group VIII metal in complex bond with carbon monoxide and a biphyllic ligand and the reaction product of a metal having an atomic number of 22 to 25 with a biphyllic ligand. Alternatively, the Group VIII metal complex may also contain a conjugated diolefin ligand which is partially $\pi$-bonded to the Group VIII metal. While no sufficient explanation is available, it is believed that the conjoint action of the metal reaction product and the Group VIII metal complex promotes the formation of linear oxygenated products, under oxonation reaction conditions. Thus, while analysis of the catalyst system at ambient conditions tends to reveal the presence of a mixture, reaction rates and conversions under oxonation conditions are considerably changed, indicating that the mixture functions as a separate and new catalytic species. The result is believed to involve a synergistic effect between the added metal and the Group VIII metal.

The catalyst system may be prepared in either of two ways: (1) by the addition of the metal, in any suitable form, and biphyllic ligand to the Group VIII metal complex and subjecting that mixture to oxonation reaction conditions; or, (2) by reaction of a biphyllic ligand, Group VIII metal, in any suitable form, and metal of atomic number 22 to 25, in any suitable form, which mixture is then subjected to oxonation reaction conditions.

In the first method, the metal of atomic number 22 to 25 and the biphyllic ligand can be added to the Group VIII metal complexes represented by the following generic formulae:

(I) $\quad M(CO)_3(XR_3)$ (II) $\quad C_nH_{2n-1}M(CO)_2(XR_3)$ wherein M is a metal selected from Group VIII of the Periodic Chart of the Elements, $XR_3$ is a biphyllic ligand in which X is a Group V–A metal selected from the group consisting of phosphorus and arsenic and R is a $C_1$–$C_{20}$ alkyl or alkoxy radical, and $n$ is an integer from 4 to 7, preferably 4 to 6. Complexes as shown above are known, their preparation being described in copending applications S.N. 522,814 filed Jan. 25, 1966, now abandoned, and S.N. 480,149 filed Aug. 16, 1965, now U.S. 3,351,666, respectively, and are generally soluble in hydrocarbon solvents, display unusual stability at elevated temperatures and pressures, and when employed as oxonation catalysts they allow homogeneous reaction systems. Both of the illustrated complexes are potent hydrogenation catalysts as well as highly active oxonation catalysts. Thus, alcohols may be prepared directly from the olefinic reactant without the necessity of a separate hydrogenation reaction. Nevertheless, hydrogenation may be minimized by employing alkoxy radicals in the biphyllic ligand. Such a practice leads to a predominance of carbonylated products in the reaction mixture. The use of alkyl radicals, however, promotes the formation of alcoholic compounds. The complexes described above can also be used as dimers.

The Group VIII metals which may be employed in the complexes are: iron, cobalt, nickel, ruthenium, rhenium, rhodium, palladium, osmium, iridium, and platinum. Of these, cobalt and rhenium are preferred, particularly cobalt.

The complex also contains a biphyllic ligand, $XR_3$ wherein X is a Group V–A metal selected from the group consisting of phosphorus and arsenic, preferably phosphorus. R is a $C_1$–$C_{20}$ alkyl or alkoxy radical. The order of preference of these radicals starts with the group containing the least number of carbon atoms, i.e., methyl, methoxy, and decreases with increasing carbon number. Particularly preferred, however, are those groups containing 1 to 8 carbon atoms. Biphyllic ligands having other than aliphatic radicals, i.e., aromatic, cyclo aliphatic, etc., do not form active catalytic species and, therefore, are excluded from use. Thus, the biphyllic ligands contemplated by this invention are phosphites, phosphines, phosphonites, arsites, arsines, arsenites and the phosphines and phosphites are preferred.

The preferred catalyst formulations may then be represented by the following generic formulae:

(III)   $Co(CO)_3PR_3$ (IV)   $C_nH_{2n-1}Co(CO)_2PR_3$ wherein R is a $C_1$–$C_8$ alkyl or alkoxy radical and $n$ is an integer from 4 to 6.

The increase in selectivity to linear products is obtained by adding to a Group VIII metal complex as defined above, a metal having an atomic number of 22 to 25, and a biphyllic ligand, $XR_3$, as defined above. The added metal may be titanium, vanadium, chromium, or manganese, the latter being particularly preferred. (The invention will be described with respect to manganese, but it is understood that titanium, chromium, and vanadium will react in a similar way.) The metal may be added in any suitable form, such as: metal, oxide, chelates, e.g., acetyl acetonates, salicylaldehydes, α-oxyacetophenones, α-nitroso-β-naphthols, etc.; soluble salts, e.g., chlorides; soaps such as salts of carboxylic acids, e.g., acetates, oleates, stearates, naphthenates, etc.; insoluble salts, such as carbonates, and the like. Preferred are the soluble forms, particularly the chelates and soaps.

The manganese should be added in amounts sufficient to increase the selectivity to linear products. Generally, increasing molar ratios of manganese to Group VIII metal, e.g., cobalt, will increase the selectivity to linear products. Normally, however, the molar ratio of added metal to Group VIII metal should be at least about 0.5/1, and may vary from about 0.5/1 to about 6/1, preferably 1/1 to 6/1 and more preferably about 1.1/1 to 3/1.

When the metal is added to the reaction system, regardless of the form in which it is added, it has been found necessary to add a biphyllic ligand. Generally, at least a stoichiometric amount of ligand, based on the metal of 22 to 25 atomic number, is added. However, molar ratios of 1:1 to 10:1, preferably 1:1 to 3:1 of biphyllic ligand to manganese, for example, are utilized.

Since the catalyst system of the present invention is generally soluble in hydrocarbon solvents, the catalyst is preferably prepared, and the oxonation reaction conducted, in the presence of a suitable inert solvent. Examples of such solvents are: $C_5$–$C_{20}$ paraffins and naphthenes, e.g., pentane, hexane, heptane, cyclohexane, etc.; $C_6$–$C_{20}$ aromatics, e.g., benzene; and inert oxygenated solvents. The paraffinic solvents are normally preferred. When desirable, the reaction, i.e., catalyst preparation or oxonation reaction, may be conducted in the presence of a large excess of the biphyllic ligand.

The active catalyst species which promotes the formation of linear products forms under oxonation reaction conditions. The catalyst is believed to be a soluble mixture comprised of the Group VIII metal complex and the reaction product of the manganese source with the biphyllic ligand. While the actual catalyst species has not been identified, analysis indicates the presence of the Group VIII metal complex and a soluble manganese form which is believed to be a complex reaction product of the manganese and the biphyllic ligand. Thus, the novel catalyst of this invention may be preformed and added to the oxonation reaction mixture or the manganese, biphyllic ligand, and Group VIII metal complex can be added to the oxonation reaction mixture, the catalyst mixture forming during the oxonation reaction.

In the second method of preparing the catalyst, or as a variation of this process, the catalyst system may be formed by reacting a suitable Group VIII metal source and the biphyllic ligand under oxonation reaction conditions in the presence of a manganic metal source. An excess of biphyllic ligand may be utilized as a solvent medium or the inert solvents previously mentioned can be employed. In this variation any suitable Group VIII metal source and maganic metal source may be employed. The sources listed above for the metal are equally applicable here for both the metal and the Group VIII metal. The molar relationship between the Group VIII metal and the added metal should be the same as previously mentioned. The biphyllic ligand, however, should be employed in at least a stoichiometric amount, based on total metal content of the reaction mixture. An excess is normally preferred, however, and the molar ratio of biphyllic ligand to total metal should be in the range of about 1:1 to 10:1, more preferably 1:1 to 3:1 should be employed. The active catalyst illustrated by Formula I will form in about 5 minutes to 2 hours, depending upon the metal forms that are employed, when the reaction mixture is subjected to oxonation reaction conditions. The catalyst form illustrated by Formula II, above, may be similarly prepared by reacting a conjugated diolefin adduct of a Group VIII metal carbonyl, prepared in accordance with the method set forth in U.S. 3,351,666, with the biphyllic ligand, under oxonation reaction conditions, and in the presence of a manganic metal source.

In a preferred embodiment of this invention, the olefinic compound to be oxygenated is utilized as the solvent medium, or is present, when the catalyst is formed. In this manner, the oxonation reaction will be initiated immediately upon the formation of the catalyst without having to separate the catalyst from its reaction mixture. Thus, a typical embodiment of this invention involves the formation of a reaction mixture, e.g., cobalt acetylacetonate, manganic naphthenate, triisobutyl phosphine, and an olefinic compound, in proportions as specified above. The reaction mixture is then subjected to oxonation reaction conditions. The oxonation of the olefinic compound will start immediately upon the formation of the catalyst, as illustrated by Formula III. Since oxonation involves the takeup of hydrogen and carbon monoxide at the olefinic linkage, the start of the oxonation reaction will usually be recognized by a sudden and relatively large pressure drop. Conversions of from about 50 to 90% based on olefin charged can be expected. When the reaction is complete, evidenced by a cessation of hydrogen and carbon monoxide consumption, the catalyst may be recovered and reused by various techniques. It is preferred, however, to transfer the reaction mixture to a flash distillation tower, at temperatures of about 100° to 300° F., and pressures of about 0.001 to 1 atmosphere, where product and unconverted feed are flashed overhead and the catalyst is recovered as a bottoms product.

The oxonation reaction involves the addition of carbon monoxide and hydrogen to an olefinic linkage. Consequently, oxonation reaction conditions may be broadly stated as those temperatures and synthesis gas (carbon monoxide and hydrogen wherein one mole of synthesis gas is equal to one mole of carbon monoxide plus one mole of hydrogen) pressures that will facilitate the addition of hydrogen and carbon monoxide to the olefinic linkage. The conditions under which this addition will occur may vary rather widely. Normally, temperatures ranging from about 200° to 500° F. may be employed with synthesis gas pressures ranging from about 300 to 3000 p.s.i.g. Preferable, however, are temperatures in the range of 325° to 450° F., more preferably 325° to 375° F. While pressures of 300 to 1500 p.s.i.g., more preferably 500 to 1200 p.s.i.g., are employed. Under normal operating conditions, the molar ratio of hydrogen to carbon monoxide in the synthesis gas may vary from about 6:1 to 1:6 with a ratio of about 1.4:1 being preferred. The molar ratio of synthesis gas to olefinic compound is also not critical, but should be at least 1.5:1, preferably at least 2.5 to 1.

While oxonation reaction conditions are defined as those conditions facilitating the addition of carbon monoxide and hydrogen to an olefinic bond, these conditions also favor the formation of the catalyst used in promoting the formation of linear oxygenated products. These conditions will favor catalyst formation whether the catalyst is formed by adding a manganese source and biphyllic ligand to a Group VIII metal complex or formed by reacting the Group VIII metal source, manganese source, and biphyllic ligand.

Catalyst concentrations in the oxonation reaction systems are best reported in terms of total metal present. Thus, catalyst concentrations should normally range from about 0.1 wt. percent to 0.5 wt. percent of the total metal based on olefin charged, and preferably 0.1 wt. percent to 0.2 wt. percent.

Generally, the organic compounds, to which the process of this invention is applicable, are characterized by having at least one nonaromatic carbon-to-carbon double bond. More specifically, however, the olefinic compounds contemplated as feedstocks for this invention include, among others: monoolefins, diolefins, aryl-substituted olefins, cycloolefins, and mixtures thereof, as well as polymers and copolymers thereof. Mixtures of olefins and hydrocarbon fractions containing appreciable quantities of olefins may also be used as feedstocks. Additionally, the olefins may be straight chain or branched, depending upon the type of oxygenated compounds desired. The hydroformylation process, and the process of this invention are particularly suited to the preparation of alcohols and aldehydes, specifically of a linear nature. Linear alcohols, for example, in the $C_{10}$–$C_{24}$ range, are desirable in the preparation of detergents. Alcohols of lower number find use as chemical intermediates in many processes. Consequently, linear olefins containing about 2 to 24 carbon atoms are preferred feedstocks, and preferably those containing about 6 to 15 carbon atoms. These olefins may be either terminal or nonterminal, since the process of this invention will yield linear products from nonterminal linear olefins. Examples of such compounds are: butene, pentene, hexene, nonene, dodecene, and the like, containing both terminal and nonterminal olefinic bonding.

This invention will be further illustrated by the following examples. However, no limitation, other than those incorporated in the appended claims, are to be implied.

EXAMPLE 1

To an autoclave was charged 100 g. octene-1, 0.30 g. of cobaltic acetylacetonate, 0.65 g. of manganic acetylacetonate and 2.8 ml. of tributylphosphine. The acetylacetonates were added in benzene solutions. The ratio of Mn/Co was 2. The synthesis was run under 1400 p.s.i.g. at 435° F. using a synthesis gas ratio of 1.4:1 H/CO. Of the total alcohols produced 72% were straight chain. Total run time was 85 minutes. Total conversion to oxygenated products was 52.3%. A normalized G.C. analysis on the final product gave:

| | Percent |
|---|---|
| Hydrocarbon | 47.7 |
| Iso-aldehyde | 5.3 |
| n-Aldehyde | 10.0 |
| Iso-alcohol | 10.3 |
| n-Alcohol | 26.2 |
| High boiling | 0.5 |

Infrared analysis of the catalyst at ambient temperatures indicated the presence of the complex: $Co(CO)_3P(C_4H_9)_3$ and a soluble form of manganese.

EXAMPLE 2

To an autoclave was charged 100 g. octene-1, 0.61 g. cobalt acetylacetonate, 1.95 g. manganic acetylacetonate and 1.77 ml. of tributylphosphine. The acetylacetonates were added in benzene solution. Run conditions were 435° F., 1400 p.s.i.g., and synthesis gas ratio of 1.1:1 H/CO. Run time was 125 minutes. A normalized G.C. analysis of the product gave:

| | Percent |
|---|---|
| Hydrocarbon | 26.1 |
| Iso-aldehyde | 0.3 |
| n-Aldehyde | 5.9 |
| Iso-alcohol | 16.0 |
| n-Alcohol | 49.9 |
| High boiling | 1.8 |

EXAMPLE 3

The results of five additional runs with octene-1 feed are tabulated below:

| | T. °F. | Time, (min.) | P (p.s.i.g.) | Conversion, percent | Alcohols Percent N | Alcohols Percent i | N/i ratio | Mn/Co |
|---|---|---|---|---|---|---|---|---|
| Run number: | | | | | | | | |
| 3 [1] | 400 | 250 | 1,350 | 88 | 70 | 16 | 4.5 | 3 |
| 4 [1] | 375 | 180 | 1,275 | 62 | 42 | 4.4 | 9.6 | 3 |
| 5 [1] | 375 | 60 | 1,225 | 15.5 | 8.1 | 4.4 | 2.8 | 0.03 |
| 6 [2] | 375 | 120 | 1,400 | 53.5 | 39.8 | 5.9 | 6.8 | 3 |
| 7 [2,3] | 375 | 150 | 1,400 | 53.3 | 42.3 | 4.6 | 7.5 | 3 |
| 8 [4] | 350 | 290 | 975 | 71.7 | 36.5 | 12.5 | 2.9 | |

[1] Synthesis gas ratio 1.4:1 H/CO.
[2] Synthesis gas ratio 1:3.8 H/CO.
[3] Manganese added as manganese naphthenate.
[4] Run without manganese.

From the data shown above, it is clear that the manganese promotes the formation of normal alcohols. Runs 3 and 5 were conducted with no or little manganese and the ratio of normal to iso alcohols was 2.9 and 2.8, respectively. However, at Mn/Co ratios of 3/1 the N/i ratio increased to a minimum of 4.5 and was as high as 9.6.

EXAMPLE 4

To an autoclave was charged .65 g. manganic acetylacetonate in 50 g. benzene, 0.46 ml. tributylphosphine, and 50 g. octene-1. 1400 p.s.i.g. synthesis gas, at an H/CO ratio of 1.4/1 was pressured into the autoclave. The temperature was raised to 435° F. At the end of one hour a conversion of 13.8% was achieved. The run was discontinued at this point due to poor results. (The conversion was attributable to residual cobalt remaining on the walls of the autoclave.) This example shows that manganese, by itself, does not catalyze oxonation reactions, much less promote the formation of normal alcohols.

What is claimed is:

1. A soluble oxonation catalyst comprising: (A) a complex selected from the group consisting of:

(I) $$M(CO)_3(XR_3)$$
and
(II) $$C_nH_{2n-1}M(CO)_2(XR_3)$$

wherein M is a Group VIII metal, X is selected from the group consisting of phosphorus and arsenic, R is selected from the group consisting of $C_1$–$C_{20}$ alkyl and alkoxy radicals, and $n$ is an integer from 4 to 7, and (B) the reaction product of a metal having an atomic number of 22 to 25 with at least a stoichiometric amount of a biphyllic ligand of the formula $XR_3$, X and R being as defined above, the molar ratio of metal having an atomic number of 22 to 25 to Group VIII metal varying from 0.5/1 to 6/1, said reaction product formed at a temperature ranging from 200 to 500° F.

2. The catalyst of claim 1 wherein the metal having an atomic number of 22 to 25 is manganese.

3. The catalyst of claim 2 wherein the complex has the formula:

wherein R is selected from the group consisting of $C_1$–$C_8$ alkyl and alkoxy radicals.

4. The catalyst of claim 3 wherein $PR_3$ is a trialkyl phosphine.

5. The catalyst of claim 2 wherein the complex has the formula:

$$C_nH_{2n-1}Co(CO)_2PR_3$$

wherein R is selected from the group consisting of $C_1$–$C_8$ alkyl and alkoxy radicals and $n$ is an integer from 4 to 6.

6. The catalyst of claim 5 wherein $PR_3$ is a trialkylphosphine.

7. A soluble oxonation catalyst comprising: (a) a complex selected from the group consisting of (III) $\qquad Co(CO)_3PR_3$ and (IV) $\qquad C_nH_{2n-1}Co(CO)_2PR_3$ wherein R is selected from the group consisting of $C_1$–$C_8$ alkyl and alkoxy radicals and $n$ is an integer from 4 to 6, and (b) the reaction product of a manganese soap with a biphyllic ligand having the formula $PR_3$, the reaction product formed at a temperature ranging from 200 to 500° F., the molar ratio of biphyllic ligand to manganese being at least stoichiometric, and the molar ratio of manganese to cobalt ranging from about 0.5/1 to 6/1.

8. The catalyst of claim 1 wherein M is cobalt.

9. The catalyst of claim 1 wherein X is phosphrous.

10. The catalyst of claim 2 wherein M is cobalt and X is phosphorus.

11. The catalyst of claim 10 wherein $PR_3$ is a trialkyl phosphine.

12. The catalyst of claim 7 wherein said biphyllic ligand is tributylphosphine.

References Cited

UNITED STATES PATENTS

| | | |
|---|---|---|
| 3,007,953 | 11/1961 | Closson et al. |
| 3,050,562 | 8/1962 | Klopfer. |
| 3,091,644 | 5/1963 | Aldridge. |
| 3,234,146 | 2/1966 | Null et al. _____ 252—431 XR |
| 3,239,570 | 3/1966 | Slaugh et al. |
| 3,351,666 | 11/1967 | Mertzweiller et al. 252—431 XR |

PATRICK P. GARVIN, Primary Examiner

U.S. Cl. X.R.

260—604, 632, 638